(12) United States Patent
Kalayci

(10) Patent No.: US 9,471,476 B2
(45) Date of Patent: *Oct. 18, 2016

(54) ERROR INJECTION INTO THE LEAF FUNCTIONS OF CALL GRAPHS

(71) Applicant: International Business Machines Corporation, Armonk, NY (US)

(72) Inventor: Metin Kalayci, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/860,610

(22) Filed: Sep. 21, 2015

(65) Prior Publication Data

US 2016/0011961 A1 Jan. 14, 2016

Related U.S. Application Data

(63) Continuation of application No. 13/901,624, filed on May 24, 2013, now Pat. No. 9,195,555, and a continuation of application No. 14/490,927, filed on Sep. 19, 2014, now Pat. No. 9,170,900.

(51) Int. Cl.
| | | |
|---|---|---|
| G06F 9/44 | (2006.01) | |
| G06F 11/00 | (2006.01) | |
| G06F 11/36 | (2006.01) | |
| G06F 11/22 | (2006.01) | |
| G06F 11/263 | (2006.01) | |

(52) U.S. Cl.
CPC ....... *G06F 11/3688* (2013.01); *G06F 11/2273* (2013.01); *G06F 11/263* (2013.01); *G06F 11/3624* (2013.01); *G06F 11/3696* (2013.01)

(58) Field of Classification Search
None
See application file for complete search history.

(56) References Cited

U.S. PATENT DOCUMENTS

| | | | | | |
|---|---|---|---|---|---|
| 5,561,762 A * | 10/1996 | Smith | ................... | G06F 11/261 | |
| | | | | | 714/33 |
| 6,477,666 B1 * | 11/2002 | Sanchez | ............. | G06F 11/3688 | |
| | | | | | 714/38.12 |
| 6,484,276 B1 * | 11/2002 | Singh | ................... | G06F 11/263 | |
| | | | | | 714/38.13 |
| 7,757,215 B1 * | 7/2010 | Zhou | ................... | G06F 11/3644 | |
| | | | | | 714/2 |
| 7,861,226 B1 * | 12/2010 | Episkopos | .......... | G06F 11/3676 | |
| | | | | | 717/124 |
| 2006/0271825 A1 * | 11/2006 | Keaffaber | ........... | G06F 11/3688 | |
| | | | | | 714/38.13 |
| 2008/0215925 A1 * | 9/2008 | Degenaro | ............. | G06F 11/263 | |
| | | | | | 714/41 |
| 2010/0251220 A1 * | 9/2010 | Jeong | ................... | G06F 11/3644 | |
| | | | | | 717/128 |
| 2011/0239048 A1 * | 9/2011 | Andrade | ............. | G06F 11/3616 | |
| | | | | | 714/35 |
| 2012/0239993 A1 * | 9/2012 | Chung | ........... | G01R 31/318547 | |
| | | | | | 714/727 |

OTHER PUBLICATIONS

Hescott et al., "A Methodology for Stochastic Fault Simulation in VLSI Processor Architectures," 2005.*
Natella et al., "Representativeness Analysis of Injected Software Faults in Complex Software," 2010 IEEE/IFIP International Conference on Dependable Systems & Networks (DSN).*
Battezzati et al., "A new low-cost non intrusive platform for injecting soft errors in SRAM-based FPGAs", 978-1-4244-1666-0/08/$25.00 Copyright 2008 IEEE, pp. 2282-2287.
Candea et al., "Automatic Failure-Path Inference: A Generic Introspection Technique for Internet Applications", Appears in Proceedings of the 3rd IEEE Workshop on Internet Applications (WIAPP), San Jose, CA, Jun. 2003.

(Continued)

*Primary Examiner* — Insun Kang

(74) *Attorney, Agent, or Firm* — Isaac J. Gooshaw

(57) ABSTRACT

A computer determines if an instance of a target in a call graph of a program being tested satisfies two or more parameters required for error injection. The computer responds to the determination that the instance of the target does satisfy the two or more parameters required for error injection, by injecting a first instance of an error into a leaf function of the call graph. Executing the first instance of the injected error results in returning to a first code path of the program being tested.

20 Claims, 3 Drawing Sheets

(56) References Cited

OTHER PUBLICATIONS

Ziade et al., "A Survey on Fault Injection Techniques", The International Arab Journal of Information Technology, vol. 1, No. 2, Jul. 2004, pp. 171-186.

"Non-intrusive Software-Implemented Fault Injection in Embedded Systems", Lecture Notes in Computer Science vol. 2847, 2003, pp. 23-38, <http://link.springer.com/chapter/10.1007/978-3-540-45214-0_5>.

U.S. Appl. No. 13/901,624, entitled "Error Injection Into Leaf Functions of Call Graphs", filed May 24, 2013.

U.S. Appl. No. 14/490,927, entitled "Error Injection Into Leaf Functions of Call Graphs", filed May 24, 2013.

* cited by examiner

ERROR INJECTION INTO THE LEAF FUNCTIONS OF CALL GRAPHS

FIELD OF THE INVENTION

The present invention relates generally to the field of program testing, and more particularly to program testing by injecting errors into leaf functions of a call graph of a program.

BACKGROUND OF THE INVENTION

Most programs undergo extensive testing before being made available to the public. Generally, the more complex the program is the more testing is required. An example of a complex program is a database management system. A database is defined as an organized collection of data. Formally, the term database refers to the data itself and supporting data structures. In a database, the data is typically organized to support a variety of processes that require interaction with the data. For example, a database containing contact information is organized such that a user can query the database using the name of a co-worker to find the contact information of the co-worker. Conversely, the user identifies a missed call from an unrecognized phone number. The user queries the database using the unrecognized phone number to identify the name of the caller.

A general-purpose database management system (DBMS) is a software system designed to allow the definition, creation, querying, update, and administration of databases. Generally, a database management system is a suite of computer programs that provide an interface between users and one or more databases. An overall goal of a general-purpose DBMS is to meet the needs the applications that interact with the databases, which often adds to the complexity of the DBMS. Meeting the needs of a large number of applications can make the development and testing of a DBMS a difficult, time consuming, and costly process.

SUMMARY

Embodiments of the present invention disclose a method, computer program product, and system for injecting errors into a leaf function of a call graph. A computer determine if an instance of a target in a call graph of a program being tested satisfies two or more parameters required for error injection. The computer responds to the determination that the instance of the target does satisfy the two or more parameters required for error injection, by injecting a first instance of an error into a leaf function of the call graph, wherein executing the first instance of the injected error results in returning to a first code path of the program being tested.

DETAILED DESCRIPTION

Figure 1:
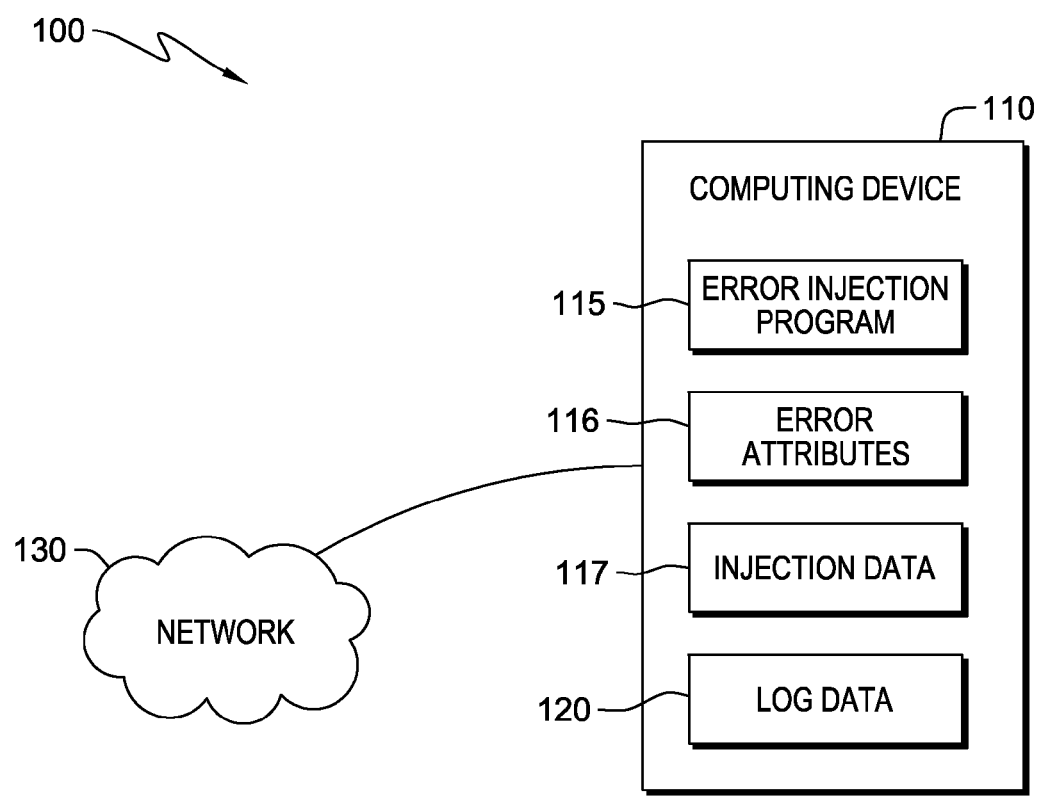
FIG. 1 is a functional block diagram illustrating a database management environment, in accordance with an embodiment of the present invention.

The interactions catered to by most existing database management systems (DBMSs) typically fall into one of four main groups including data definition, updating, retrieval, and administration. Data definition includes the processes of defining new data structures for a database, removing data structures from the database, and modifying the structure of existing data. Data definition can be summarized as memory management, e.g., memory allocation. Data updating, i.e., a data write, includes the processes of inserting, modifying, and deleting data. Data retrieval, i.e., a data read, includes obtaining information either for end-user queries and reports or for processing by applications. Data administration includes registering and monitoring database activity, enforcing data security, monitoring database performance, maintaining data integrity, control of concurrency, and recovering data as needed.

Physically, database servers are dedicated computers that hold the actual databases and run only the DBMS and related software. Database servers are usually multiprocessor computers, with generous memory and redundant array of independent disks (RAID) disk arrays used for data storage. Hardware database accelerators, connected to one or more servers via a high-speed channel, are also used in large volume transaction processing environments. DBMSs are often at the heart of most database applications. DBMSs can be built around a custom multitasking kernel with built-in networking support. However, many DBMSs rely on a standard operating system to provide networking support.

Many DBMSs include application software that accesses the database on behalf of end-users, such that the DBMS does not interface directly with the end-users. Application programmers often use an application programming interface (API) to directly interface with the DBMS. Database designers and database administrators interact with the DBMS through dedicated interfaces to build and maintain the applications' databases, and thus require knowledge and understanding of the DBMS operation and the external interfaces and tuning parameters of the DBMS. Some notable features that may be included in a DBMS include database logs, graphics components, query optimizers, and specialized tools for database design.

A popular database model for general-purpose databases is the relational model, or more precisely, the relational model as represented by the SQL language. The relational model for database management is a database model based on first-order predicate logic. A relational database is a collection of data items organized as a set of formally described tables from which data can be accessed easily. The software used in a relational database is called a relational database management system (RDBMS).

In the relational model of a database, all data is represented in terms of tuples, grouped into relations. A database organized in terms of the relational model is a relational database. The purpose of the relational model is to provide a declarative method for specifying data and queries. A user can directly state what information the database contains and what information the user wants, while the RDBMS handles the task of describing data structures for storing the data and retrieval procedures for answering the query. The process of creating a logical database design using the relational model uses a methodical approach known as normalization. The goal of normalization is to ensure that each elementary fact is only recorded in one place, so that insertions, updates, and deletions automatically maintain data consistency.

SQL is a special-purpose programming language designed for managing data held in a relational database management system (RDBMS). Database languages are special-purpose languages, which facilitate at least one of data definition, data manipulation, and data queries. For example, SQL combines the roles of data definition, data manipulation, and query in a single language. A data definition language defines data types and the relationships among them. A data manipulation language performs tasks such as inserting, updating, or deleting data occurrences. A data query language allows searching for data and computing derived information.

An important feature of many DBMS programs is error handling. The Structured Query Language communications area (SQLCA) structure is often used within relational database programs to return error diagnostic information to application programs after every SQL statement is executed. The primary, but not singularly useful, error diagnostic information is held in the field SQLCODE within the SQLCA block.

Often, as a DBMS is developed, program bugs arise from the process of patching, or fixing, problems in the DBMS programming and by the process of creating or modifying database(s). Common database errors are often caused by read errors, write errors, and memory errors, e.g., allocation and free space. As the program bugs are patched, new program bugs can be unexpectedly produced. Typically, program bugs arise from mistakes and errors made by people in either a source code or design of a program, and a few are caused by compilers producing incorrect code. Program bugs can trigger errors that can in turn have a wide variety of ripple effects, e.g., a systemic spread of an error, with varying levels of inconvenience to the user of the program. Program bugs can exist in varying forms of severity including subtle effects on a program's functionality, and serious program bugs can cause a program to completely cease functioning, i.e., a program crash.

Given the complexity of many DBMSs, program bugs are a common byproduct of DBMS development. The complexity of a DBMS is further increased by the applications that are supported by the DBMS. The combination of DBMS and supported applications generates a vast number of code paths that can lead to the same error, e.g., read, write, memory errors. Therefore, the testing of DBMSs has become a standard step in the process of developing DBMSs.

A testing approach for a DBMS often includes the injection of errors to simulate the occurrence of naturally generated errors. However, testing a single error using a single code path is typically insufficient when there are multiple code paths that can all lead to that same error. Most current approaches to error injection use a deterministic approach that limits the number of code paths that are tested by any one injected error. To test all the code paths using a deterministic approach requires the injection of multiple types of errors increasing the complexity, costs, and time needed to complete the testing.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

While the present invention is directed toward an embodiment that has been adapted for the testing of database management systems, this is not to be interpreted as a limitation. Other embodiments of the present invention can be adapted for the testing of other types of programs.

The present invention will now be described in detail with reference to the Figures. FIG. 1 is a functional block diagram illustrating a database management environment, generally designated 100, in accordance with one embodiment of the present invention. Database management environment 100 includes network 130 and computing device 110 which includes error injection program 115, error attributes 116, injection data 117, and log data 120.

In various embodiments of the present invention, computing device 110 is computing device that can be a stand-alone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to error injection program 115, error attributes 116, injection data 117, and log data 120 and is capable of running error injection program 115. Computing device 110 may include internal and external hardware components, as depicted and described in further detail with respect to FIG. 3.

In this exemplary embodiment, error injection program 115, error attributes 116, injection data 117, and log data 120 are stored on computing device 110. However, in other embodiments, error injection program 115, error attributes 116, injection data 117, and log data 120 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110 and error injection program 115, error attributes 116, injection data 117, and log data 120 in accordance with a desired embodiment of the present invention.

In exemplary embodiments, error injection program 115 injects configurable errors into the leaf functions of a call graph, to test database management systems (DBMSs). A call graph is a directed graph that represents calling relationships between subroutines in a program. A subroutine is a named sequence of program instructions that perform a specific task, packaged as a unit. This unit can then be used in programs wherever that particular task should be performed. In a call graph, each node represents a different subroutine and each edge that connects two nodes indicates that one subroutine calls the other subroutine. Note that certain programming languages may distinguish between a callable unit, function, subroutine, subprogram, procedure, or method; but all of aforementioned are herein referred to as subroutines in this embodiment. The last subroutine that is called, e.g., the last subroutine in a sequence of a subroutine calling another subroutine, is herein denoted as a leaf function. Leaf functions typically include read, write, or memory program instructions, e.g., a write function which writes a piece of data to a memory.

Call graphs are a basic program analysis result that can be used for human understanding of programs, or as a basis for further analysis, such as an analysis that tracks the flow of values between procedures. Call graphs display the hierarchy of calls for subroutines and can be either dynamic or static. A dynamic call graph is a record of an execution of the program, e.g., as output by a profiler. Thus, a dynamic call graph can be exact, but only describes one run of the program. A static call graph is a call graph intended to represent every possible run of the program. The exact static call graph is un-decidable, so static call graph algorithms are generally over-approximations. In other words, every call relationship that can occur between the subroutines of the program is represented in the static call graph.

In exemplary embodiments, by error injection program 115 triggering the injection and execution of errors at the leaf functions of a call graph the exact contents, i.e., the calling relationships between subroutines, of the call graph do not need to be known. The errors that are injected into the call graph are selectively injected by error injection program 115 such that the injected errors do not cause fatal errors to occur for the target, e.g., a program that receives the injected error does not crash. To further minimize the occurrence of fatal errors for a target, the types of errors most often injected are write errors, read errors, and memory errors.

In an exemplary embodiment, error injection program 115 also verifies that a target to receive a given injected error is controlled by error injection program 115, meaning that the injection of the error will not result in a fatal error for the target. If the target is not controlled by error injection program 115, then error injection program 115 does not inject the error. While the exemplary embodiments described herein have been configured for error injection during the testing of DBMSs, it is to be noted that other embodiments can be configured to inject errors into the leaf functions of calls graphs of a variety of other types of programs.

In exemplary embodiments, a given configurable error typically includes at least three attributes, namely a trigger for error injection, the type of error to be injected, and a probability for injection, all of which are included in error attributes 116. Error injection program 115 utilizes a time parameter to control the overall process of error injection. For example, error injection program 115 receives a command to begin error injection using a given set of error parameters, which are included in injection data 117. Error injection program 115 begins to inject errors according to these received error parameters until a given time period has expired. When the time period has expired error injection program 115 ceases error injection, completes execution of the injected errors, and returns the results of the test.

In exemplary embodiments, error injection program 115 can initiate a race condition by executing multiple instances of the same injected error. A race condition occurs when a second error begins execution before a first error has finished execution. By initiating a race condition various code paths can be tested using a single configured error, which is injected multiple times. In general, a race condition can be initiated by executing two instances of a given configured error using two different timings for the errors, i.e., the two errors execute at different rates. The following table illustrates such a configured error and two race conditions initiated using multiple instances of that same error.

```
test case 1:
{
    insert record 1
    update record 1
    delete record 1
}
race condition 1:
Instantiation 1 - test case 1       vs.  Instantiation 2 - test case 1
    insert record 1                          insert record 1 - fails, record 1
                                             exists
    update record 1
    delete record 1                          update record 1 - fails, record 1
                                             does not exist
                                             delete record 1 - fails, record 1
                                             does not exist
race condition 2:
Instantiation 1 - test case 1       vs.  Instantiation 2 - test case 1
    insert record 1 - first execution        insert record 1 - fails, record 1
                                             exists
    update record 1
    delete record 1                          update record 1 - fails, record 1
                                             does not exist
    insert record 1 - second execution
    update record 1                          delete record 1 - success, record 1
                                             did exist
    delete record 1 - fails, record 1 does not exist
```

As seen in race condition 1 in the above table, test case 1 has two instantiations that are competing with each other for the execution of commands regarding record 1. Both instantiation 1 and instantiation 2 are executed only once. As a result of the single instance of execution of instantiation 1 and instantiation 2, instantiation 2 fails to execute all commands, for reasons indicated by the notation. However, in race condition 2, the second execution of instantiation 1 re-creates record 1 before the execution of the delete command by instantiation 2. Therefore, the delete command by instantiation 2 is successful and the execution of the delete command by instantiation 1 fails since record 1 no longer exists. By initiating race conditions using multiple and repeated instances of a given error with varied timings, many code pathways can be tested using a single type of error. The application of various execution parameters allows for a wide variety of testing conditions to be explored.

In an exemplary embodiment, error attributes 116, includes a list of configurable attributes that control the configuration of an error to be injected. For example, some common configurable attributes can include the probability of an error to be injected, the number of errors to be injected, the timing of the injected errors, a concurrent number of errors to be injected, a diagnostic level attribute, and the location of a given error injection. Other configurable attributes included in error attributes 116 include a concurrent number of errors to be injected, a trigger for error injection, a specified error to be injected, a random selection of an error to be injected, a random selection of a type of error to be injected, a specified type of error to be injected, a randomly selected target for error injection, a randomly selected type of target for error injection, a specified target for error injection, and a specified type of target for error injection. It should be noted that a diagnostic level attribute is not an attribute used for customizing an error for injection, rather the diagnostic level attribute is an attribute used to create error injection and error execution records in log data 120. In certain embodiments, error attributes 116 can include a variety of one or both of configurable and non-configurable error attributes that are not listed herein.

Using the configurable attributes included in error attributes 116, error injection program 115 configures errors for injection. Errors that have been configured for injection are saved, as part of error attributes 116, for later injection by error injection program 115. For example, a given error being configured for injection is to include a probability that the type of error to be injected is one of a read, write, or memory error that is to be randomly selected. As a result, error injection program 115 accesses error attributes 116, identifies the corresponding probability attribute, and applies that attribute to the error to be injected. In another example, an attribute is a probability that controls how often a given error is injected, e.g., one injection in one thousand. Error injection program 115 applies the probability for error injection to the error to be injected. In yet another example, an attribute includes a filter operation which controls error injection, such that any request called by program X initiates a random error injection, again, error injection program 115 applies this attribute to the error to be injected. In a last example, an attribute indicates that fifty concurrent instances of a given error are to be injected, and as before, error injection program 115 applies this attribute to the error to be injected. The attributes included in error attributes 116 can be turned on and off, and modified in real time while testing is executing. The real time modification of error parameters during testing can reduce the total testing time required for a given program.

In exemplary embodiments, the attributes included in error attributes 116 include attributes for diagnostic levels, probability for error injection, the number of errors to be injected, triggers for error injection, specified errors to be injected, and the specified target for error injection. The injection of an error is often dependent on the inclusion of a trigger in a target of the call graph. As such, error injection program 115 often controls error injection by utilizing a trigger parameter. Generally, a trigger is a request, often from a program, or a sequence of events that are identified by error injection program 115. In some situations, a target for error injection can also be a trigger. If error injection program 115 identifies a trigger in a call graph, then error injection program 115 injects an error according to the parameters for error injection (see the discussion of injection data 117 below for further details regarding the parameters for error injection). The type of error injected can be random or very specific. In certain testing scenarios a random selection of error type will exercise a greater number of code paths, while in other scenarios the selection of a specific error type will exercise a greater number of code paths. In other cases, the random selection of a target can exercise a greater number of code paths than specification of a single target. To further increase the number of code paths exercised, the trigger for error injection can also be random. In general, the greater the number of code paths exercised the more complete and efficient the testing will be. As such, the probability attribute for injection of a given error, included in error attributes 116, is highly customizable.

In some embodiments, certain errors are injected with a relatively high frequency during the initial phases of DBMS testing, while the same errors are injected far less frequently during later phases of testing, as program bugs are patched. Two other common attributes for error customization include a target attribute and a diagnostic level attribute. A target attribute indicates a specific target program, component, or program function that is to be targeted for error injection. If error injection program 115 identifies the target, including the trigger, in a call graph, then error injection program 115 compares the attributes of the customized errors, included in error attributes 116, to the injection parameters, which are included in injection data 117. If there is a match between the attributes of the customized errors and the injection parameters, then error injection program 115 begins to inject errors following the parameters for error injection.

In an exemplary embodiment, injection data 117, includes the parameters that can be applied to control the injection of errors as well as the parameters to be applied when determining if a given test has been completed. For example, injection data 117 includes records indicating the total number of times a given error has been injected and a threshold limit for injection during a given test. Injection data 117 also includes a list of targets that are known to be controlled by error injection program 115. In certain embodiments, injection data 117 can also include other information such as the time and date an error was customized for injection.

In an exemplary embodiment, the parameters for error injection, included in injection data 117, include the identity of a subroutine that is invoked in the call graph, a degree of completion of a program function, a degree of completed testing, a probability for error injection, a number of errors to be injected, a trigger for error injection, a specified time period for error injection, a specified error to be injected, and a specified target for error injection. Many of the parameters can be set to a specific value, e.g., to inject 300 errors, or the parameters can be selected randomly, e.g., the target is randomly selected.

In some embodiments, the degree of testing is used to regulate the injection of errors. For example, if 98% of the time period for testing of a program has elapsed, then trying to inject 3000 more errors randomly would not be feasible since the time period would expire before the error injection was completed. In other embodiments, the degree of completion of a program function is used to regulate error injection. For example, if the function of a program is to create a statistical analysis of a small data file and that process is 99% complete, then trying to inject 50 more errors would not likely succeed as the function would finish before the error injection was completed.

In an exemplary embodiment, injection data 117 is accessed by error injection program 115 in response to a prompt to begin error injection. Error injection program monitors the call graph for instances of the target. If the target is identified, then error injection program 115 compares the parameters included in injection data 117 to be applied for error injection to the attributes of the configured errors, included in error attributes 116. If there is a match between the parameters controlling error injection, including the target parameter, and the attributes of the error, then error injection program 115 begins error injection.

In an exemplary embodiment, log data 120 includes records of errors that have been injected during testing as well as records indicating the results of errors that were executed during the testing. As errors are executed during testing, the results are recorded in log data 120. The information included in log data 120 can be used to identify potential problems in the code of a DBMS under test. The information can also be used to further modify the injection parameters for future testing purposes.

Figure 2:
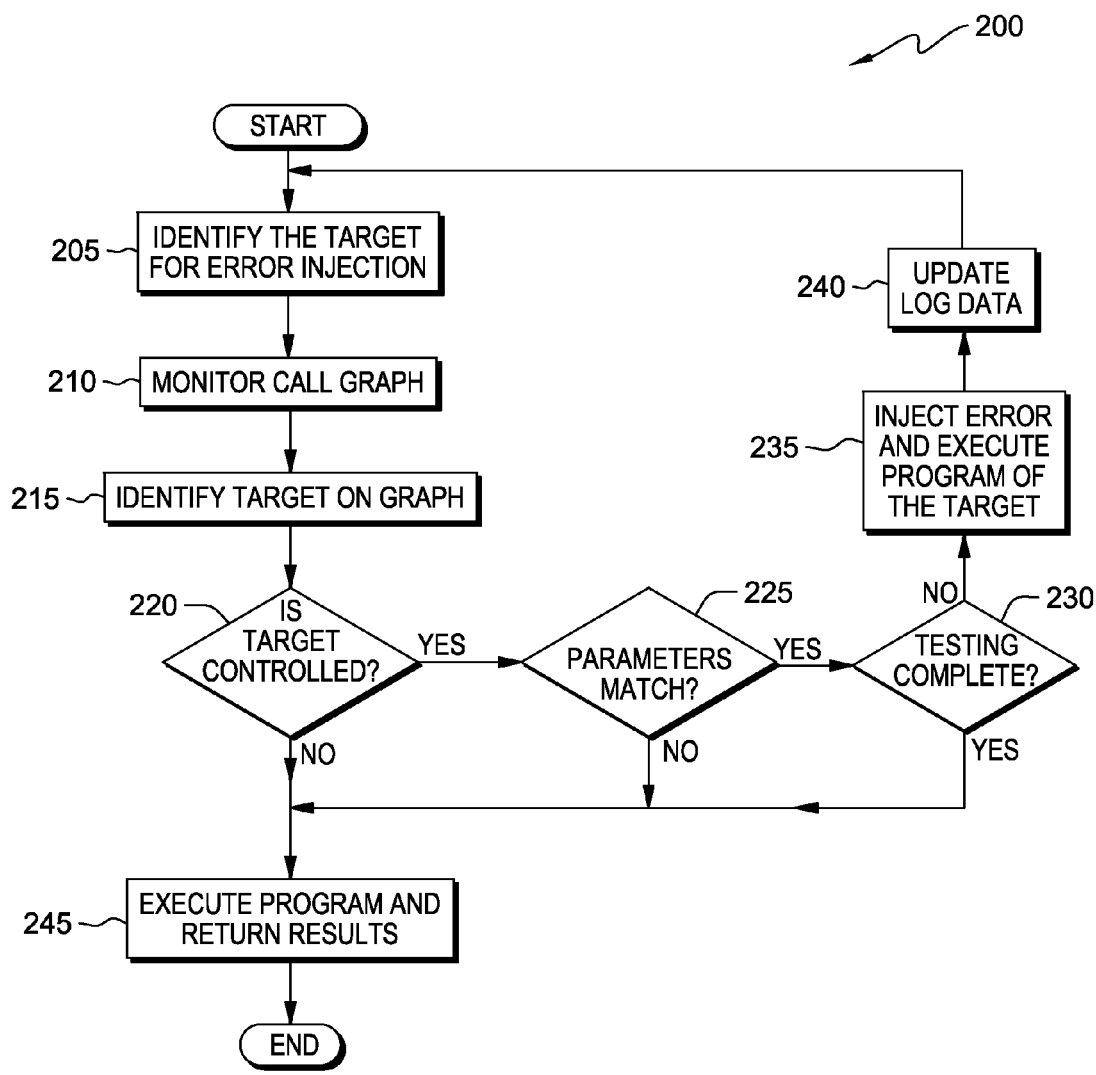
FIG. 2 illustrates operational steps of an error injection program, on a computing device within the database management environment of FIG. 1, in accordance with an embodiment of the present invention.

FIG. 2 is a flow chart, 200, illustrating the operational steps utilized by error injection program 115 to inject errors into the leaf functions of a call graph, in accordance with an exemplary embodiment.

In this exemplary embodiment, error injection program 115 identifies the target for error injection, in step 205. Error injection program 115 accesses the information included in injection data 117 and identifies a target to be searched for in the call graph. Error injection program 115 begins monitoring the call graph for instances of the identified target, in step 210. In step 215, error injection program 115 identifies an instance of the target in the call graph. For example, error injection program 115 accesses injection data 117 and identifies subroutine X as the specified target for error injection. Next, error injection program 115 begins monitoring the call graph for instances of subroutine X in a call graph of program Z. Error injection program 115 then identifies five instances of subroutine X in the call graph.

In decision step 220, error injection program 115 determines if error injection program 115 controls the identified target. In some embodiments, not all instances of a target are controlled by error injection program 115. Error injection program 115 accesses the information included in injection data 117 and identifies a list of targets that are controlled by error injection program 115. To determine if the identified target is controlled, error injection program 115 compares the identified target to the list, a match indicates that the target is controlled. In response to the determination that the target is not controlled by error injection program 115, i.e., the target is not on the list (decision step 220, no branch), error injection program 115 proceeds to step 245. In response to the determination that the target is controlled by error injection program 115 (decision step 220, yes branch), error injection program 115 proceeds to decision step 225.

In decision step 225, error injection program 115 determines if the parameters controlling error injection match the attributes of the configured error to be injected. Error injection program 115 accesses the information included in injection data 117 and the information included in error attributes 116. To determine if there is a match, error injection program 115 compares the parameters to be applied for error injection, included in injection data 117, to the attributes of the configured error to be injected, included in error attributes 116. In response to the determination that the parameters controlling error injection do not match the attributes of the configured error to be injected (decision step 225, no branch), error injection program 115 proceeds to step 245. For example, a parameter for error injection includes a criteria for trigger A to be present along with the target. However, of the five identified instances of the target, none include trigger A. In response, error injection program 115 determines that there is not a match.

In response to the determination that the parameters controlling error injection do match the attributes of the configured error to be injected (decision step 225, yes branch), error injection program 115 proceeds to decision step 230. For example, a parameter for error injection includes a criteria for trigger B to be present along with the target. However, of the five identified instances of the target, only two include trigger B. In response, only those instances of the target with trigger B are determined to be a match. The targets that did match are retained by error injection program 115 for possible error injection, while non-matching targets are excluded from possible error injection.

In decision step 230, error injection program 115 determines if the testing is complete. To determine if the testing is complete, error injection program 115 accesses the information included in injection data 117 and determines if the parameters for test completion have been met. For example, if the test has a time duration parameter of three hours and only two hours of testing have elapsed then error injection program 115 would determine that the test is not complete. In another example, a test criteria specifies that one thousand errors of a type B need to be injected before a test is considered complete. Error injection program 115 accesses the data included in injection data 117 and confirms that one thousand errors of the type B have been injected. In response, error injection program determines that testing is complete. If the testing is complete (decision step 230, yes branch), then error injection program 115 proceeds to step 245. If the testing is not complete (decision step 230, no branch), then error injection program 115 proceeds to step 235.

In step 235, error injection program 115 accesses injection data 117 and error attributes 116 and injects the matched customized error according to the parameters for injection. Then error injection program 115 executes the program of the target with the injected error before proceeding to step 240. In step 240, error injection program 115 updates the log data, included in log data 120, with the results of the executed error. Error injection program 115 then returns to step 205 and begins the process of injecting the next error.

In step 245, error injection program 115 executes all injected errors that have not been executed previously as well as the program's subroutines included in the call graph. For example, there may be several errors that have been injected but have not yet been processed along with numerous subroutines in the call graph that have yet to be executed. After all of the subroutines and injected errors are executed, error injection program 115 tabulates the results of the executed errors and subroutines of the program, included in the call graph, and saves this information as part of log data 120. Error injection program also flags any errors that occurred but were not a result of an injected error and saves this information as part of log data 120.

Figure 3:
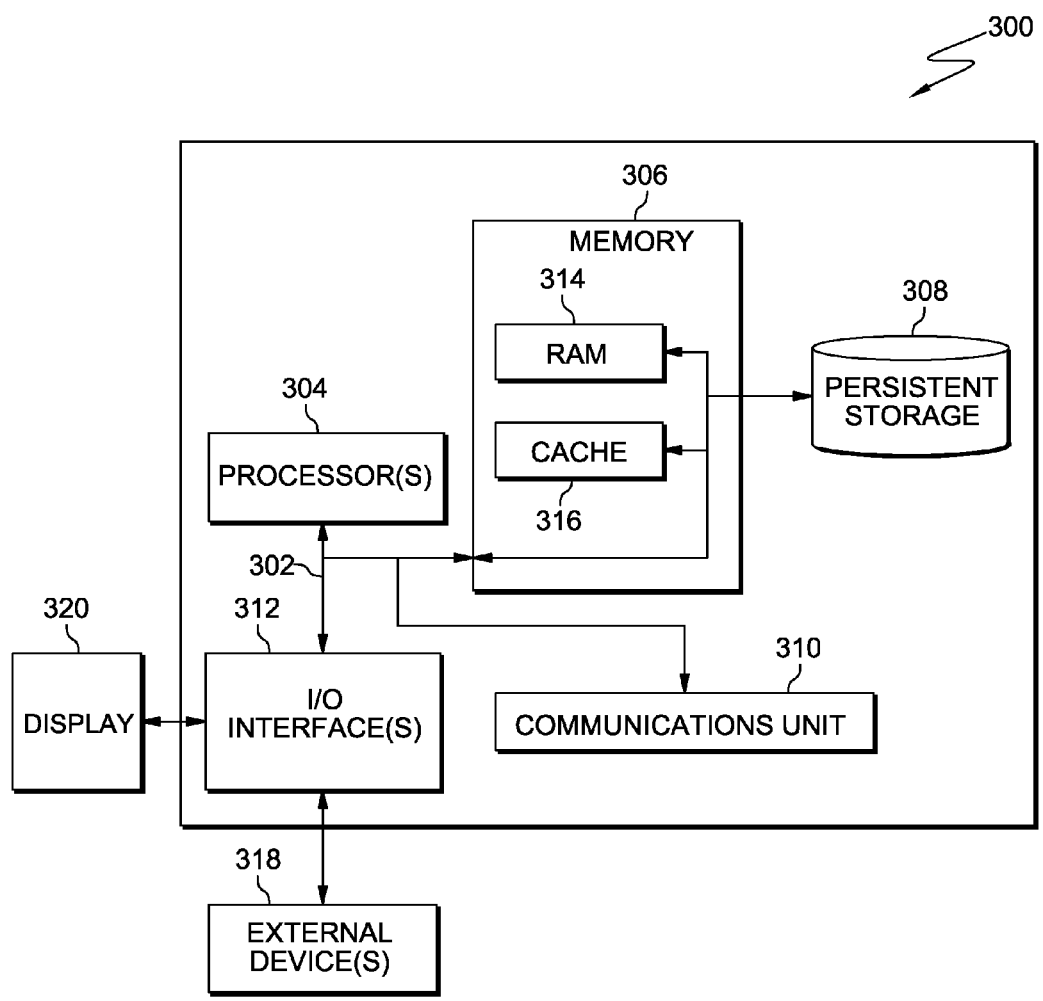
FIG. 3 depicts a block diagram of components of the computing device executing the error injection program, in accordance with an embodiment of the present invention.

FIG. 3 depicts a block diagram, 300, of components of computing device 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Error injection program 115, error attributes 116, injection data 117, and log data 120 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. Error injection program 115, error attributes 116, injection data 117, and log data 120 may be downloaded to persistent storage 308 through communications unit 310.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., error injection program 115, error attributes 116, injection data 117, and log data 120, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for injecting errors into a leaf function of a call graph, the computer program product comprising: one or more computer-readable hardware storage media and program instructions stored on the one or more computer-readable storage media, the program instructions comprising:
program instructions to determine if an identified instance of a target in a monitored call graph of a program being tested satisfies two or more parameters required for error injection; and
program instructions to respond to the determination that the instance of the target does satisfy the two or more parameters required for error injection, by injecting a first instance of an error into a leaf function of the call graph and executing the first instance of the injected error that results in returning to a first code path of the program being tested.

2. The computer program product of claim 1, the program instructions comprising:
program instructions to inject a second instance of the error into the leaf function of the call graph, wherein the execution of the second instance of the injected error results in a second code path, of the program being tested, being followed.

3. The computer program product of claim 1, wherein the injection and subsequent execution of the error do not result in a fatal error for the program being tested.

4. The computer program product of claim 1, wherein the error that is injected into the leaf function of the call graph is one of a write error, a read error, or a memory error.

5. The computer program product of claim 1, wherein the two or more parameters required for error injection include at least two parameters selected from the group consisting of an identity of a subroutine that is invoked in the call graph, a degree of completion of a program function, a degree of completed testing, a probability for error injection, a number of errors to be injected, a trigger for error injection, a specified time period for error injection, a specified error to be injected, and a specified target for error injection.

6. The computer program product of claim 1, the program instructions further comprising:
program instructions to inject a third instance of the error into the leaf function of the call graph, wherein concurrent execution of the first instance and the third instance results in a competition between the first instance and the third instance to complete respective executions of the first instance and the third instance.

7. The computer program product of claim 2, wherein the first instance and the second instance of the error are sequentially executed.

8. The computer program product of claim 2, wherein the first instance and the second instance of the error are concurrently executed.

9. The computer program product of claim 1, the program instructions further comprising:
program instructions to execute the error that is injected into the leaf function of the call graph to generate a result; and
program instructions to return the result.

10. The computer program product of claim 1, wherein the error that is injected into the leaf function of the call graph includes at least two attributes that are configurable, the two configurable attributes being selected from the group consisting of a diagnostic level, a probability for error injection, a number of errors to be injected, a trigger for error injection, a specified error to be injected, and a specified target for error injection.

11. A computer system for injecting errors into a leaf function of a call graph, the computer system comprising: one or more computer processors; one or more computer readable storage medium; program instructions stored on the computer readable storage medium for execution by at least one of the one or more processors, the program instructions comprising: program instructions to determine if an identified instance of a target in a monitored call graph of a program being tested satisfies two or more parameters required for error injection; and program instructions to respond to the determination that the instance of the target does satisfy the two or more parameters required for error injection, by injecting a first instance of an error into a leaf function of the call graph and executing the first instance of the injected error that results in returning to a first code path of the program being tested.

12. The computer system of claim 11, the program instructions comprising:
program instructions to inject a second instance of the error into the leaf function of the call graph, wherein the execution of the second instance of the injected error results in a second code path, of the program being tested, being followed.

13. The computer system of claim 11, wherein the injection and subsequent execution of the error do not result in a fatal error for the program being tested.

14. The computer system of claim 11, wherein the error that is injected into the leaf function of the call graph is one of a write error, a read error, or a memory error.

15. The computer system of claim 11, wherein the two or more parameters required for error injection include at least two parameters selected from the group consisting of an identity of a subroutine that is invoked in the call graph, a degree of completion of a program function, a degree of completed testing, a probability for error injection, a number of errors to be injected, a trigger for error injection, a specified time period for error injection, a specified error to be injected, and a specified target for error injection.

16. The computer system of claim 11, the program instructions further comprising:
program instructions to inject a third instance of the error into the leaf function of the call graph, wherein concurrent execution of the first instance and the third instance results in a competition between the first instance and the third instance to complete respective executions of the first instance and the third instance.

17. The computer system of claim 12, wherein the first instance and the second instance of the error are sequentially executed.

18. The computer system of claim 12, wherein the first instance and the second instance of the error are concurrently executed.

19. The computer system of claim 11, the program instructions further comprising:

program instructions to execute the error that is injected into the leaf function of the call graph to generate a result; and program instructions to return the result.

20. The computer system of claim 11, wherein the error that is injected into the leaf function of the call graph includes at least two attributes that are configurable, the two configurable attributes being selected from the group consisting of a diagnostic level, a probability for error injection, a number of errors to be injected, a trigger for error injection, a specified error to be injected, and a specified target for error injection.

* * * * *